US008857178B2

(12) United States Patent
O'Hara

(10) Patent No.: US 8,857,178 B2
(45) Date of Patent: Oct. 14, 2014

(54) NOZZLED TURBOCHARGER TURBINE AND ASSOCIATED ENGINE AND METHOD

(75) Inventor: Steve O'Hara, Zionsville, IN (US)

(73) Assignee: Caterpillar Inc., Peoria, IL (US)

( * ) Notice: Subject to any disclaimer, the term of this patent is extended or adjusted under 35 U.S.C. 154(b) by 379 days.

(21) Appl. No.: 13/171,133

(22) Filed: Jun. 28, 2011

(65) Prior Publication Data

US 2013/0000300 A1 Jan. 3, 2013

(51) Int. Cl.
F02B 33/44 (2006.01)
F01D 25/24 (2006.01)
F01D 17/12 (2006.01)
F04D 29/44 (2006.01)
F04D 29/54 (2006.01)
F04B 17/00 (2006.01)
B23P 15/04 (2006.01)
F02B 37/22 (2006.01)
F02B 37/24 (2006.01)
F01D 9/02 (2006.01)
F02B 37/02 (2006.01)
F01D 9/04 (2006.01)

(52) U.S. Cl.
CPC ............ F02B 37/22 (2013.01); F05D 2220/40 (2013.01); Y02T 10/144 (2013.01); F05D 2250/232 (2013.01); F05D 2250/52 (2013.01); F02B 37/24 (2013.01); F01D 9/026 (2013.01); F05D 2260/606 (2013.01); F02B 37/025 (2013.01); F05D 2230/53 (2013.01); F01D 9/045 (2013.01)
USPC ....... 60/602; 415/208.2; 415/159; 415/182.1; 415/205; 417/406; 29/889.2

(58) Field of Classification Search
USPC .............. 60/602, 605.2; 415/203–205, 208.2, 415/208.4, 150, 157–159, 184, 186, 182.1, 415/212.1, 214.1, 211.2; 417/406–407; 416/187, 186 R, 185; 29/889.2
See application file for complete search history.

(56) References Cited

U.S. PATENT DOCUMENTS

| 2,701,528 | A | * | 2/1955 | Angell | 417/407 |
| 2,749,842 | A | * | 6/1956 | Angell et al. | 417/406 |
| 3,614,259 | A | * | 10/1971 | Neff | 415/205 |
| 3,652,176 | A | * | 3/1972 | Walsh | 415/182.1 |
| 5,465,482 | A | | 11/1995 | Elvekjaer et al. | |
| 5,964,574 | A | * | 10/1999 | Meier et al. | 415/208.2 |
| 6,035,639 | A | * | 3/2000 | Kolmanovsky et al. | 60/605.2 |
| 6,269,643 | B1 | | 8/2001 | Schmidt et al. | |
| 6,287,091 | B1 | * | 9/2001 | Svihla et al. | 417/407 |
| 6,345,961 | B1 | | 2/2002 | Oklejas, Jr. | |

(Continued)

FOREIGN PATENT DOCUMENTS

JP 2009287434 A * 12/2009 ............. F02M 25/07

Primary Examiner — Thai Ba Trieu
(74) Attorney, Agent, or Firm — Leydig, Voit & Mayer

(57) ABSTRACT

A turbocharger for an internal combustion engine includes a center housing, a shaft rotatably supported in the center housing, and a turbine wheel connected at one end of the shaft. A turbine housing is connected to the center housing and disposed around the turbine wheel. A bore formed in the turbine housing extends from a gas outlet end of the turbine housing to an annular stop surface of the turbine housing disposed adjacent the turbine wheel. A nozzle ring disposed in the bore surrounds a portion of the turbine wheel. An outlet cone is disposed at least partially in the bore and surrounds a remaining portion of the turbine wheel. The outlet cone is connected to the gas outlet end of the turbine housing.

20 Claims, 10 Drawing Sheets

(56) References Cited

U.S. PATENT DOCUMENTS

| | | | |
|---|---|---|---|
| 6,672,061 B2* | 1/2004 | Schmid et al. | 60/605.2 |
| 6,694,735 B2* | 2/2004 | Sumser et al. | 60/605.2 |
| 7,300,246 B2 | 11/2007 | Durocher et al. | 415/191 |
| 7,363,761 B1* | 4/2008 | Dickerson | 60/602 |
| 7,426,831 B2* | 9/2008 | Grissom | 60/602 |
| 7,428,814 B2 | 9/2008 | Pedersen et al. | 60/602 |
| 7,442,006 B2 | 10/2008 | Nguyen et al. | 415/208.4 |
| 7,559,199 B2* | 7/2009 | Sausse et al. | 60/602 |
| 7,814,752 B2 | 10/2010 | Hu | |
| 7,854,585 B2 | 12/2010 | Petitjean | 415/150 |
| 8,123,470 B2* | 2/2012 | Serres et al. | 415/158 |
| 2002/0176774 A1 | 11/2002 | Zinsmeyer et al. | 415/150 |
| 2007/0130943 A1 | 6/2007 | Sausse et al. | |
| 2008/0193288 A1 | 8/2008 | Anschel et al. | 415/208.2 |
| 2009/0041573 A1* | 2/2009 | Serres et al. | 415/51 |
| 2009/0060726 A1* | 3/2009 | Severin et al. | 415/182.1 |
| 2010/0068046 A1 | 3/2010 | Rainville et al. | 415/203 |
| 2010/0316490 A1* | 12/2010 | Severin et al. | 415/157 |
| 2011/0038715 A1* | 2/2011 | Frank et al. | 415/159 |
| 2012/0023936 A1* | 2/2012 | Kruiswyk et al. | 60/605.2 |

* cited by examiner

NOZZLED TURBOCHARGER TURBINE AND ASSOCIATED ENGINE AND METHOD

TECHNICAL FIELD

This patent disclosure relates generally to turbochargers for use with internal combustion engines.

BACKGROUND

Internal combustion engines are supplied with a mixture of air and fuel for combustion within the engine that generates mechanical power. To maximize the power generated by this combustion process, the engine is often equipped with a turbocharged air induction system.

A turbocharged air induction system includes a turbocharger that uses exhaust from the engine to compress air flowing into the engine, thereby forcing more air into a combustion chamber of the engine than the engine could otherwise draw into the combustion chamber. This increased supply of air allows for increased fuelling, resulting in an increased engine power output.

The fuel energy conversion efficiency of an engine depends on many factors, including the efficiency of the engine's turbocharger. Previously proposed turbocharger designs include turbines having separate gas passages formed in their housings. In such turbines, two or more gas passages may be formed in the turbine housing and extend in parallel to one another such that exhaust pulse energy fluctuations from individual engine cylinders firing at different times are preserved as the exhaust gas passes through the turbine. These exhaust pulses can be used to improve the driving function of the turbine and increase its efficiency.

Internal combustion engines also use various systems to reduce certain compounds and substances that are byproducts of the engine's combustion. One such system, which is commonly known as exhaust gas recirculation (EGR), is configured to recirculate metered and often cooled exhaust gas into the intake system of the engine. The combustion gases recirculated in this fashion have considerably lower oxygen concentration than the fresh incoming air. The introduction of recirculated gas in the intake system of an engine and its subsequent introduction in the engine cylinders results in lower combustion temperatures being generated in the engine, which in turn reduces the creation of certain combustion byproducts, such as compounds containing oxygen and nitrogen.

One known configuration for an EGR system used on turbocharged engines is commonly referred to as a high pressure EGR system. The high pressure designation is based on the locations in the engine intake and exhaust systems between which exhaust gas is recirculated. In a high pressure EGR system (HP-EGR), exhaust gas is removed from the exhaust system from a location upstream of a turbine and is delivered to the intake system at a location downstream of a compressor. When entering the intake system, the recirculated exhaust gas mixes with fuel and fresh air from the compressor and enters the engine's cylinders for combustion.

In engines lacking specialized components, such as pumps, that promote the flow of EGR gas between the exhaust and intake systems of the engine, the maximum possible flow rate of EGR gas through the EGR system will depend on the pressure difference between the exhaust and intake systems of the engine. This pressure difference is commonly referred to as the EGR driving pressure. It is often the case that engines require a higher flow of EGR gas than what is possible based on the EGR driving pressure present during engine operation.

In the past, various solutions have been proposed to selectively adjust the EGR driving pressure in turbocharged engines. One such solution has been the use of variable nozzle or variable geometry turbines. A variable nozzle turbine includes moveable blades disposed around the turbine wheel. Motion of the vanes changes the effective flow rate of the turbine and thus, in one aspect, creates a restriction that increases the pressure of the engine's exhaust system during operation. The increased exhaust gas pressure of the engine results in an increased EGR driving pressure, which in turn facilitates the increased flow capability of EGR gas in the engine.

Although this and other known solutions to increase the EGR gas flow capability of an engine have been successful and have been widely used in the past, they require use of a variable geometry turbine, which is a relatively expensive device that includes moving parts operating in a harsh environment. Moreover, variable geometry turbines typically destroy or mute the pulse energy of the exhaust gas stream of the engine, which results in lower turbine efficiency and higher fuel consumption.

SUMMARY

The disclosure describes, in one aspect, a turbocharger for an internal combustion engine. The turbocharger includes a center housing, a shaft rotatably supported in the center housing, and a turbine wheel connected at one end of the shaft. A turbine housing is connected to the center housing and disposed around the turbine wheel. A bore formed in the turbine housing extends from a gas outlet end of the turbine housing to an annular stop surface of the turbine housing disposed adjacent the turbine wheel. A nozzle ring disposed in the bore surrounds a portion of the turbine wheel. An outlet cone is disposed at least partially in the bore and surrounds a remaining portion of the turbine wheel. The outlet cone is connected to the gas outlet end of the turbine housing.

In another aspect, the disclosure describes an internal combustion engine. The internal combustion engine includes a plurality of cylinders fluidly connectable to an intake manifold and to at least one exhaust collector. A turbocharger of the internal combustion engine includes a turbine and a compressor. The turbine has a turbine housing connected to a center housing. The turbine housing further has a gas outlet end and a gas inlet. The gas inlet is in fluid communication with the at least one exhaust collector. A turbine wheel is connected to a shaft, which is rotatably mounted within the center housing such that the turbine wheel is enclosed within the turbine housing. A bore is formed in the turbine housing and extends from the gas outlet end of the turbine housing to an annular stop surface of the turbine housing that is located adjacent the turbine wheel. A nozzle ring is disposed in the bore and surrounds a portion of the turbine wheel. An outlet cone is disposed at least partially in the bore and surrounds a remaining portion of the turbine wheel. The outlet cone is connected to the turbine housing at the gas outlet end thereof.

In yet another aspect, the disclosure describes a method for assembling a turbocharger. The method includes providing a center housing. A turbine housing is installed onto the center housing. The turbine housing includes a bore extending from a gas outlet end of the turbine housing to a stop surface. A turbine wheel connected to a shaft is inserted into the center housing through the bore such that the turbine wheel is disposed within the turbine housing and the shaft is rotatably mounted to the center housing. A nozzle ring is installed into the turbine housing through the bore. The installed nozzle ring is disposed circumferentially around at least a portion of the turbine wheel. An outlet cone is inserted and located into the bore. The outlet cone has a generally hollow tubular shape such that an inner portion of the outlet cone is positioned around a remaining portion of the turbine wheel. The outlet cone is then connected to the turbine housing.

DETAILED DESCRIPTION

Figure 1:
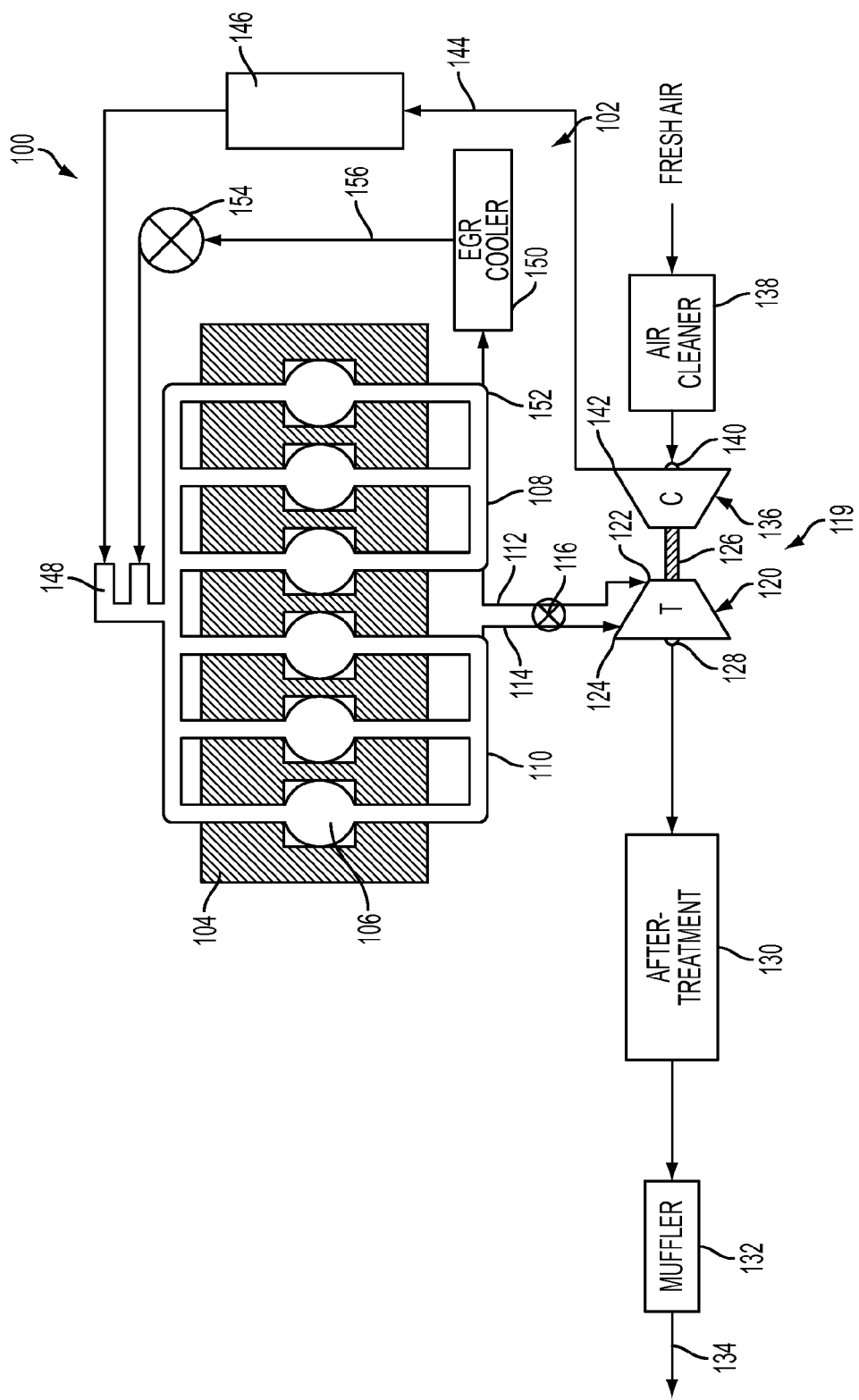
FIG. 1 is a block diagram of an internal combustion engine in accordance with the disclosure.

This disclosure relates to an improved turbine configuration used in conjunction with a turbocharger in an internal combustion engine to promote the engine's efficiency while also simplifying turbocharger service and manufacturing. A simplified block diagram of an engine 100 having a high pressure EGR system 102 is shown in FIG. 1. Although the EGR system 102 is shown in FIG. 1, it is optional because the structures and methods for turbines shown and described herein are applicable to other engine configurations having a low-pressure EGR system (not shown) or no EGR system.

In the illustrated embodiment, the engine 100 includes a crankcase 104 that houses a plurality of combustion cylinders 106. Six combustion cylinders are shown in an inline configuration, but any other number of cylinders arranged in a different configuration such as a "V" configuration may be used. The plurality of cylinders 106 is fluidly connected via exhaust valves (not shown) to first and second exhaust conduits 108 and 110. Each of the first and second exhaust conduits 108 and 110 is connected to a respective exhaust pipe 112 and 114, which is in turn connected to a turbine 120 of a turbocharger 119. As shown, an optional balance valve 116 is fluidly interconnected between the two exhaust pipes 112 and 114 and is arranged to route exhaust gas from the first exhaust pipe 112 to the second exhaust pipe 114 as necessary during operation. It is noted that the balance valve 116 is optional and may be omitted in an engine configuration having a different EGR system or no EGR system.

In the illustrated embodiment, the turbine 120 has a separated housing, which includes a first inlet 122 fluidly connected to the first exhaust pipe 112, and a second inlet 124 connected to the second exhaust pipe 114. Each inlet 122 and 124 is disposed to receive exhaust gas from one of the first and second exhaust conduits 108 and 110 during engine operation. The exhaust gas operates to cause a turbine wheel (not shown here) connected to a shaft 126 to rotate before exiting the turbine 120 through an outlet 128. The exhaust gas at the outlet 128 is optionally passed though other exhaust components, such as an after-treatment device 130 that mechanically and chemically removes combustion byproducts from the exhaust gas stream, and/or a muffler 132 that dampens engine noise, before being expelled to the environment through a stack or tail pipe 134.

Rotation of the shaft 126 causes the wheel (not shown here) of a compressor 136 to rotate. As shown, the compressor 136 is a radial compressor configured to receive a flow of fresh, filtered air from an air filter 138 through a compressor inlet 140. Pressurized air at an outlet 142 of the compressor 136 is routed via a charge air conduit 144 to a charge air cooler 146 before being provided to an intake manifold 148 of the engine 100. In the illustrated embodiment, air from the intake manifold 148 is routed to the individual cylinders 106 where it is mixed with fuel and combusted to produce engine power. The charge air cooler 146 is optional.

The EGR system 102 includes an optional EGR cooler 150 that is fluidly connected to an EGR gas supply port 152 of the first exhaust conduit 108. A flow of exhaust gas from the first exhaust conduit 108 can pass through the EGR cooler 150 where it is cooled before being supplied to an EGR valve 154 via an EGR conduit 156. The EGR valve 154 may be electronically controlled and configured to meter or control the flow rate of the gas passing through the EGR conduit 156. An outlet of the EGR valve 154 is fluidly connected to the intake manifold 148 such that exhaust gas from the EGR conduit 156 may mix with compressed air from the charge air cooler 146 within the intake manifold 148 of the engine 100.

The pressure of exhaust gas at the first exhaust conduit 108, which is commonly referred to as back pressure, is higher than ambient pressure because of the flow restriction presented by the turbine 120. For the same reason, backpressure is present in the second exhaust conduit 110. The pressure of the air or the air/EGR gas mixture in the intake manifold 148, which is commonly referred to as boost pressure, is also higher than ambient because of the compression provided by the compressor 136. In large part, the pressure difference between back pressure and boost pressure, coupled with the flow restriction of the components of the EGR system 102, determine the maximum flow rate of EGR gas that may be achieved at various engine operating conditions. Further, the pressure difference between back pressure at the inlet of the turbine 120 and pressure at the outlet of the turbine 120 provides the driving force that imparts power to the turbine 120.

During operation of the engine 100, especially when driving EGR, the backpressure at the first exhaust conduit 108 is maintained at a higher level than the back pressure at the second exhaust conduit 110. To accomplish this pressure difference in the particular embodiment shown in FIG. 1, the turbine 120 and related piping is configured to have different exhaust gas flow restriction characteristics, with the flow entering through the first inlet 122 being subject to a higher flow restriction than the flow entering through the second inlet 124. This different or asymmetrical flow restriction characteristic of the turbine 120 provides an increased pressure difference to drive EGR gas without increasing the backpressure of substantially all cylinders 106 of the engine 100. At times when no back pressure increase is desired in the first exhaust conduit 108 to drive EGR gas flow, the optional balance valve 116 may be used to balance out the exhaust flow through each of the two inlets 122 and 124 of the turbine 120.

Figure 2:
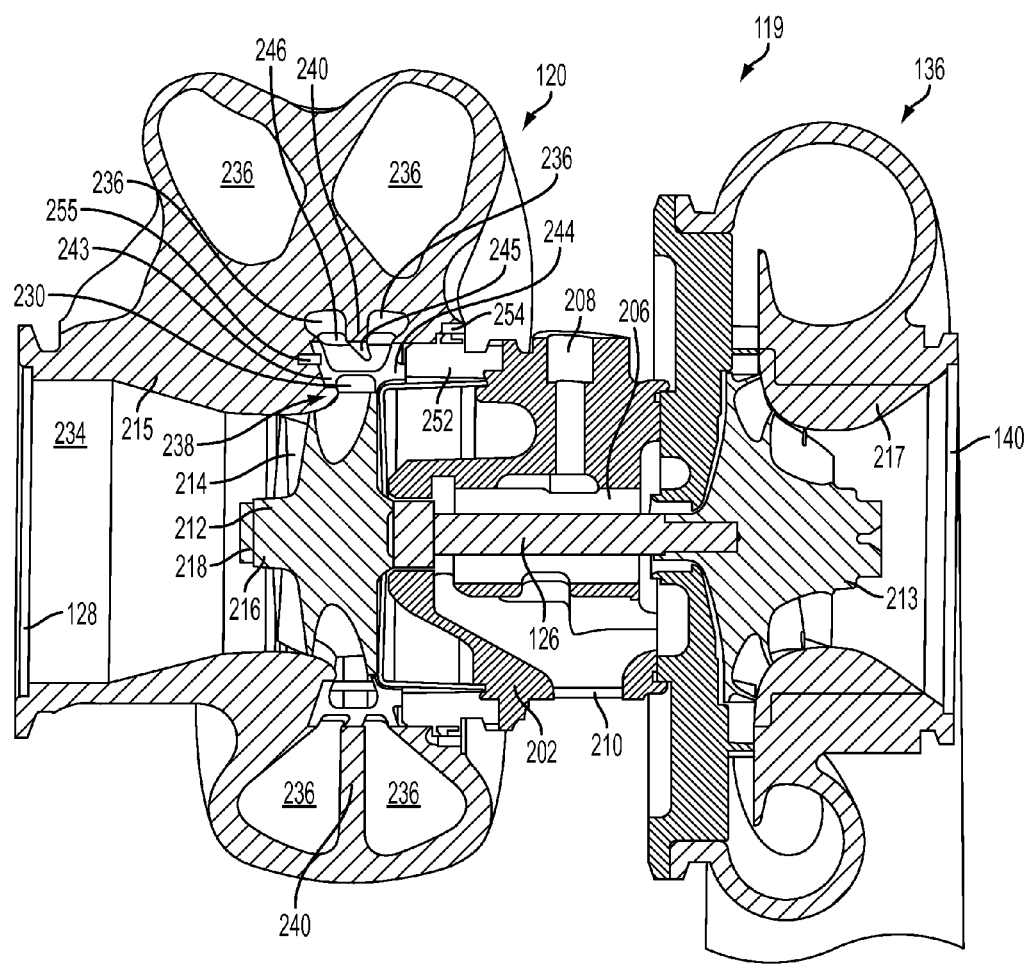
FIG. 2 is a section of a turbocharger assembly in accordance with the disclosure.

In the description that follows, structures and features that are the same or similar to corresponding structures and features already described are denoted by the same reference numerals as previously used for simplicity. Accordingly, a cross section of one embodiment of the turbocharger 119 is shown in FIG. 2. The turbocharger 119 includes the turbine 120 and compressor 136 that are connected to one another via a center housing 202. As shown, the center housing 202 surrounds a portion of the shaft 126 and includes a bearing (not shown) disposed within a lubrication cavity 206. The lubrication cavity 206 includes lubricant inlet and outlet openings 208 and 210 that provide lubrication to the bearing as the shaft 126 rotates during operation.

Figure 3:
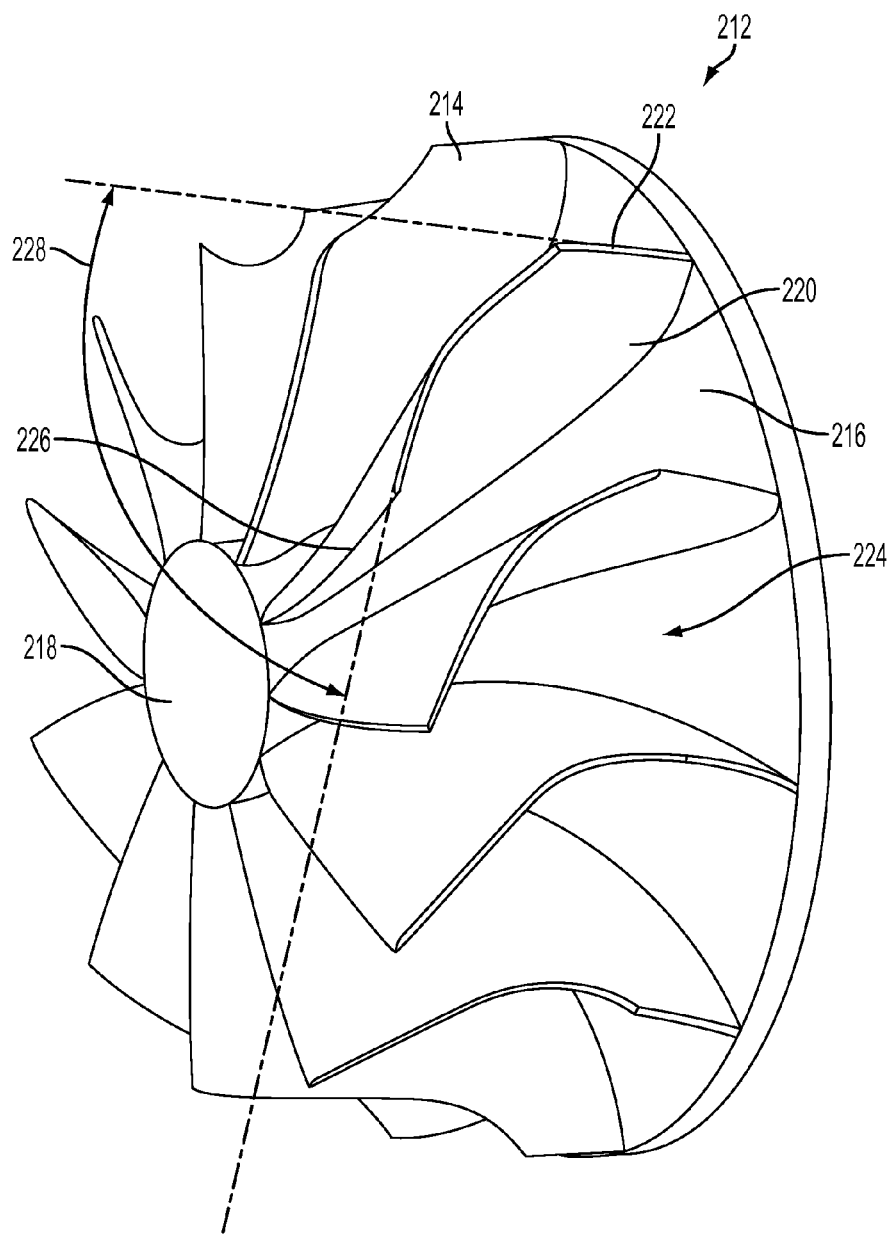
FIG. 3 is a perspective view of a turbine wheel in accordance with the disclosure.

The shaft 126 is connected to a turbine wheel 212 at one end and to a compressor wheel 213 at another end. The turbine wheel 212 is configured to rotate within a turbine housing 215 that is connected to the center housing 202. The compressor wheel 213 is disposed to rotate within a compressor housing 217. The turbine wheel 212 includes a plurality of blades 214 radially arranged around a hub 216. The hub 216 is connected to an end of the shaft 126 by a fastener 218 and is configured to rotate the shaft 126 during operation. A detailed outline view of the turbine wheel 212 is shown in FIG. 3. In reference to that figure, each blade 214 is spaced at an equal radial distance from its adjacent blades 214 around the hub 216. In the illustrated embodiment, the turbine wheel 212 includes eleven blades 214 but any other number of blades may be used.

Each blade 214 includes a body section 220 having a generally curved shape. The body section 220 is connected to the hub 216 along one side. A leading edge 222 is disposed at a radially outermost portion of the wheel 212 and is configured to admit a portion of a flow that operates to turn the wheel 212. As flow enters into radial channels 224 defined between the blades 214, the flow momentum pushes against the body sections of the blades 214, thus imparting a moment that turns the wheel 212. In the illustrated embodiment, for example, the wheel 212 is configured to rotate in a counterclockwise direction when viewed from the perspective of the fastener 218.

The hub 216 has a generally curved conical shape such that flow entering into the channels 224 from a radial direction is turned by about 90 degrees and exits the wheel in an axial direction. The rotation of the wheel 212 is augmented as it pushes against a discharge portion 226 of each blade 214. The discharge portion 226 has a generally curved shape that is disposed at a discharge angle 228 relative to an opposite portion of each blade 214 adjacent the inlet of the channel 224 as shown. In the illustrated embodiment, the discharge angle 228 is about 60 degrees, which is an angle that is steeper than corresponding angles used on typical turbines by about 4 to 5 degrees. By virtue of the steeper discharge angle 228, the momentum of axially flowing gas can provide additional power to rotate the turbine wheel 212.

Returning now to FIG. 2, the turbine wheel 212 is rotatably disposed radially within an annular exhaust gas inlet slot 230 defined within the turbine housing 215. The slot 230 provides exhaust gas to the turbine wheel 212 in a radial direction along the leading edges 222 of the blades 214. Exhaust gas passing through the turbine wheel 212 is provided to a turbine outlet bore 234 that, in the illustrated embodiment, is fluidly connected to the turbine outlet 128. The gas inlet slot 230 is fluidly connected to inlet gas passages 236 formed in the turbine housing 215 and configured to fluidly interconnect the gas inlet slot 230 with the turbine inlets 122 and 124 (FIG. 1). In this way, during operation, exhaust gas provided to the turbine inlets 122 and 124 is routed to the turbine wheel 212 to operate the turbocharger 119.

To accomplish this, each of the two turbine inlets 122 and 124 is connected to one of two inlet gas passages 236. Each gas passage 236 has a generally scrolled shape that wraps around the area of the turbine wheel 212 and bore 234 and that is open to the slot 230 around the entire periphery of the turbine wheel 212. The cross sectional flow area of each passage 236 decreases along a flow path of gas entering the turbine 120 via the inlets 122 and 124 and exiting the housing through the slot 230. In this embodiment, the two passages 236 have substantially the same cross sectional flow area at any given radial location around the wheel 212. Although two passages 236 are shown, a single passage or more than two passages may be used.

A radial nozzle ring 238 is disposed substantially around the entire periphery of the turbine wheel 212. As will be discussed in more detail in the paragraphs that follow, the radial nozzle ring 238 is disposed in fluid communication with both passages 236 and defines the slot 230 around the wheel 212. As shown in FIG. 2, a divider wall 240 is defined in the housing 215 between the two passages 236. The divider wall 240 is disposed radially outwardly relative to the slot 230 such that gas flow from the two passages 236 may be combined before entering the slot 230 and reaching the wheel 212.

Figure 4:
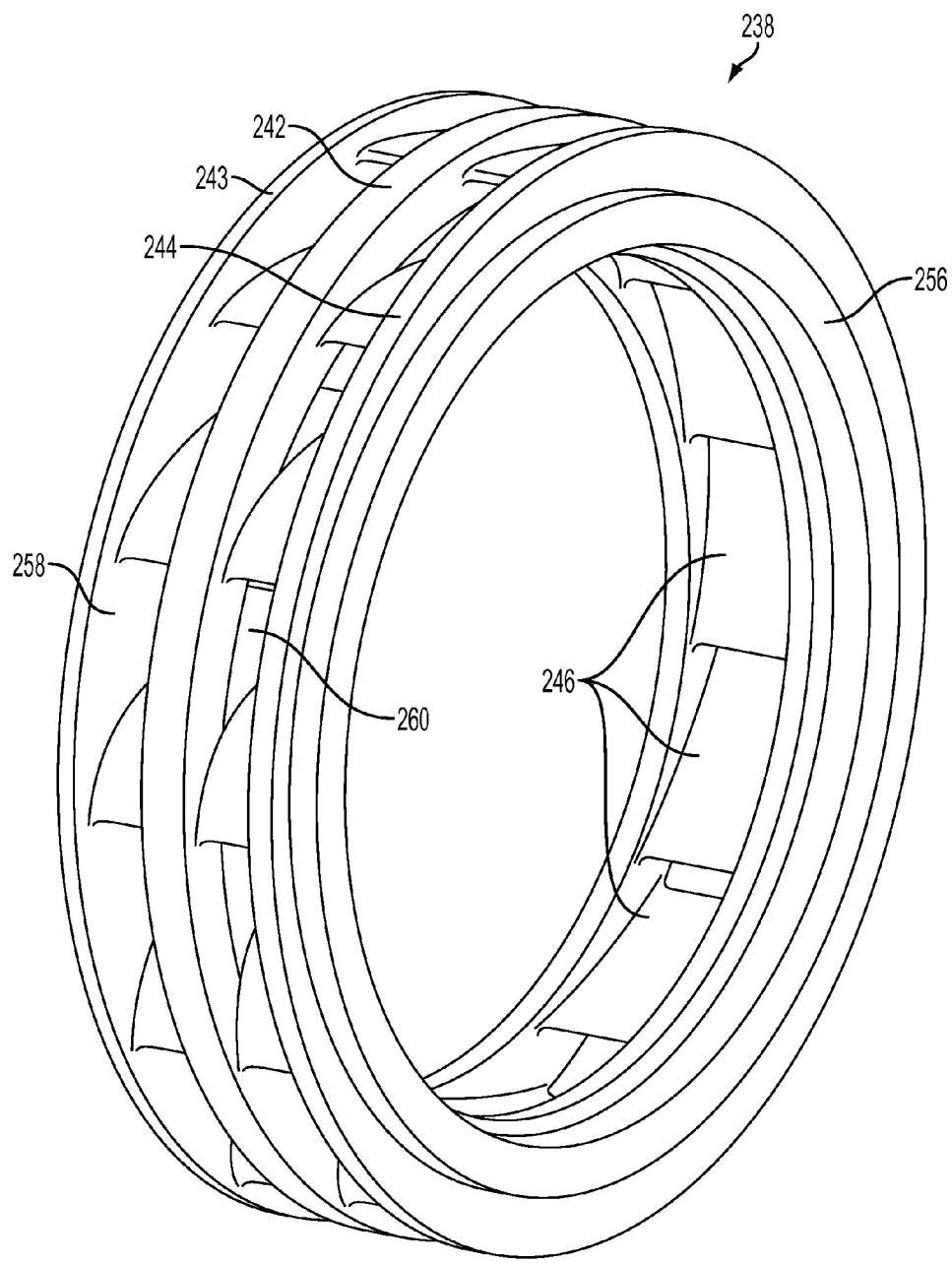
FIG. 4 is an outline view of a radial nozzle ring in accordance with the disclosure.

In further reference to FIG. 4, the nozzle ring 238 includes an inner ring 242 disposed between two outer rings, namely a first outer ring 243 and a second outer ring 244. The inner ring 242 is positioned adjacent the divider wall 240 and forms an extension thereof, as shown in FIG. 2, to form a divider wall extension portion 245. In the illustrated embodiment, the inner ring 242 has an asymmetrical shape that provides different flow areas between each of the first and second outer rings 243 and 244 and the inner ring 242 for gas passing through each of the two passages 236 into the slot 230, but symmetrical or flow-balanced configurations may also be used. For example, the nozzle rings 238 shown in FIGS. 6 and 8 include inner rings 242 that are symmetrically positioned between the first and second outer rings 243 and 244. Further, a plurality of vanes 246 is symmetrically disposed between the first and second outer rings 243 and 244. The vanes 246 intersect the inner ring 242 as they extend axially along the rotation axis of the turbine wheel 212. Although the vanes 246 are shown symmetrically disposed around the ring 238, other configurations may be used to promote the uniform radial flow of exhaust gas from the slot 230 to the wheel 212.

Figure 5:
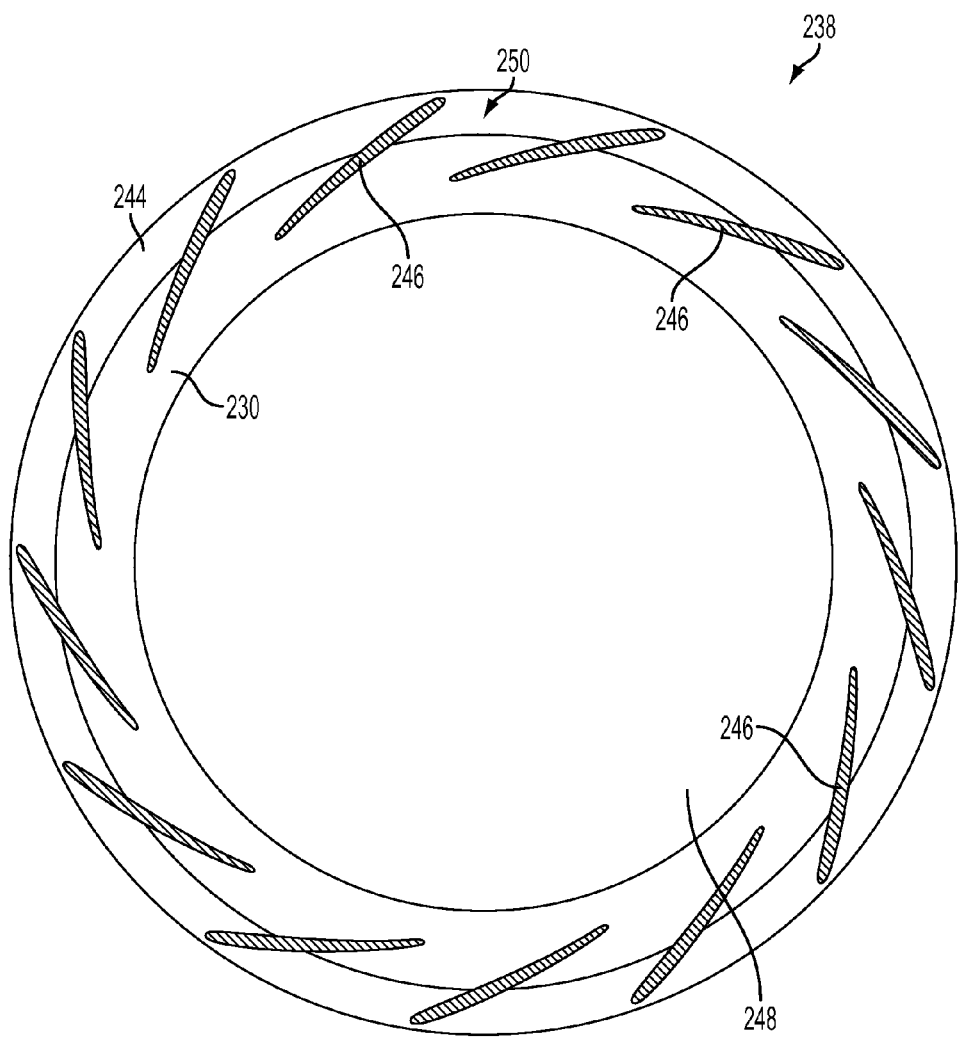
FIG. 5 is a cross section of nozzle ring in accordance with the disclosure.

The shape and configuration of the vanes 246 can be best seen in the cross section of FIG. 5. As shown, the vanes 246 are arranged symmetrically around a central opening 248 of the ring 238 such that inclined flow channels 250 are defined between adjacent vanes 246. The flow momentum of gas passing through the channels 250 is directed generally tangentially and radially inward towards an inner diameter of the wheel 212 (shown in FIG. 2) such that wheel rotation may be augmented. Although the vanes 246 further have a generally curved airfoil shape to minimize flow losses of gas passing over and between the vanes 246, thus providing uniform inflow conditions to the turbine wheel, they also provide structural support to the inner ring 242. In the illustrated embodiment there are thirteen vanes connected to the ring 238, but any other number of vanes may be used. In a preferred embodiment, the number of vanes 246 is different than the number of blades 214 such that resonance conditions are avoided during operation.

Returning now to FIG. 2, the nozzle ring 238 is disposed within a bore formed in the turbine housing 215. A retainer 252 is disposed to retain the ring 238 within the housing 215. The retainer 252 extends peripherally around the ring 238 and is retained to the housing by one or more fasteners 254. Further, one or more pins 255 disposed in corresponding cavities formed in the housing and in the ring 238 may be used to properly orient the nozzle ring 238 relative to the housing 215 during assembly. The nozzle ring 238 may have a clearance fit with the bore of the housing 215 such that sufficient clearance is provided for thermal growth of each component during operation to minimize thermal stresses.

The second outer ring 244 of the nozzle ring 238 defines a contact pad 256 that abuts the retainer 252. The contact pad 256 is disposed to provide axial engagement of the nozzle ring 238 with the housing 215. The illustrated configuration of the nozzle ring 238 includes two pluralities of inlet openings 258 and 260, each of which is defined between adjacent vanes 246, the inner ring 242, and the corresponding first or second outer rings 243 or 244. Accordingly, a first plurality of inlet openings 258 is defined between the first outer ring 243 and the inner ring 242, and a second plurality of inlet openings 260 is defined between the inner ring 242 and the second outer ring 244.

As shown, each of the first plurality of inlet openings 258 is in fluid communication with the corresponding gas passage 236. The inlet openings 258 permit the substantially unobstructed flow of gas therethrough. However, the inclination of the divider wall extension portion 245 of the inner ring 242, which is towards the right in the illustration of FIG. 2, reduces or obstructs a portion of the flow area of each of the second plurality of inlet openings 260.

The reduced flow opening of the second plurality of inlet openings 260 as compared to the first plurality of inlet openings 258 provides an asymmetrical flow restriction to gas present in one of the gas passages 236 over the other. In the embodiment shown and in further reference to FIG. 1, the turbine inlet 122 that is fluidly connected to the first exhaust conduit 108 is configured to be in fluid communication with the second plurality of inlet openings 260. The turbine inlet 124 that is fluidly connected to the second exhaust conduit 110 is correspondingly in fluid communication with the first plurality of inlet openings 258. Notwithstanding any flow diversion that may be selectively provided by the balance valve 116 (FIG. 1) between the two turbine inlets 122 and 124 during operation, the reduced flow area corresponding to the second plurality of inlet openings 260 in the turbine will provide an increased gas pressure in the first exhaust conduit 108 such that the flow of EGR gas may be augmented, as previously described.

Therefore, the unique flow characteristics of the turbine 120 may be determined by the size, shape, and configuration of the nozzle ring 238 while other portions of the turbine may advantageously remain unaffected or, in the context of designing for multiple engine platforms, the remaining portions of the turbine may remain substantially common for various engines and engine applications. Accordingly, the specific symmetrical or asymmetrical flow characteristics of a turbine that is suited for a particular engine system may be determined by combining a turbine, which otherwise may be common for more than one engine, with a particular nozzle ring having a configuration that is specifically suited for that particular engine system.

The customization capability provided by a specialized nozzle ring in an otherwise common turbocharger assembly presents numerous advantages over known turbochargers. First, an engine or parts manufacturer may streamline its production by reducing the number of different turbochargers that are manufactured. In this way, waste, inventory, and costs may be reduced in the market for original and service parts. Moreover, parts may remain common even when other surrounding components and systems, such as the EGR system, undergo changes to keep up with changing performance demands. Even further, low production number engine applications, which may otherwise not have a specialized turbocharger manufactured to optimally suit them because of cost considerations, may now be more easily customized at a lower cost by simply incorporating a unique nozzle ring in an otherwise common turbocharger. These and other advantages may be realized by use of interchangeable rings.

Figure 6:
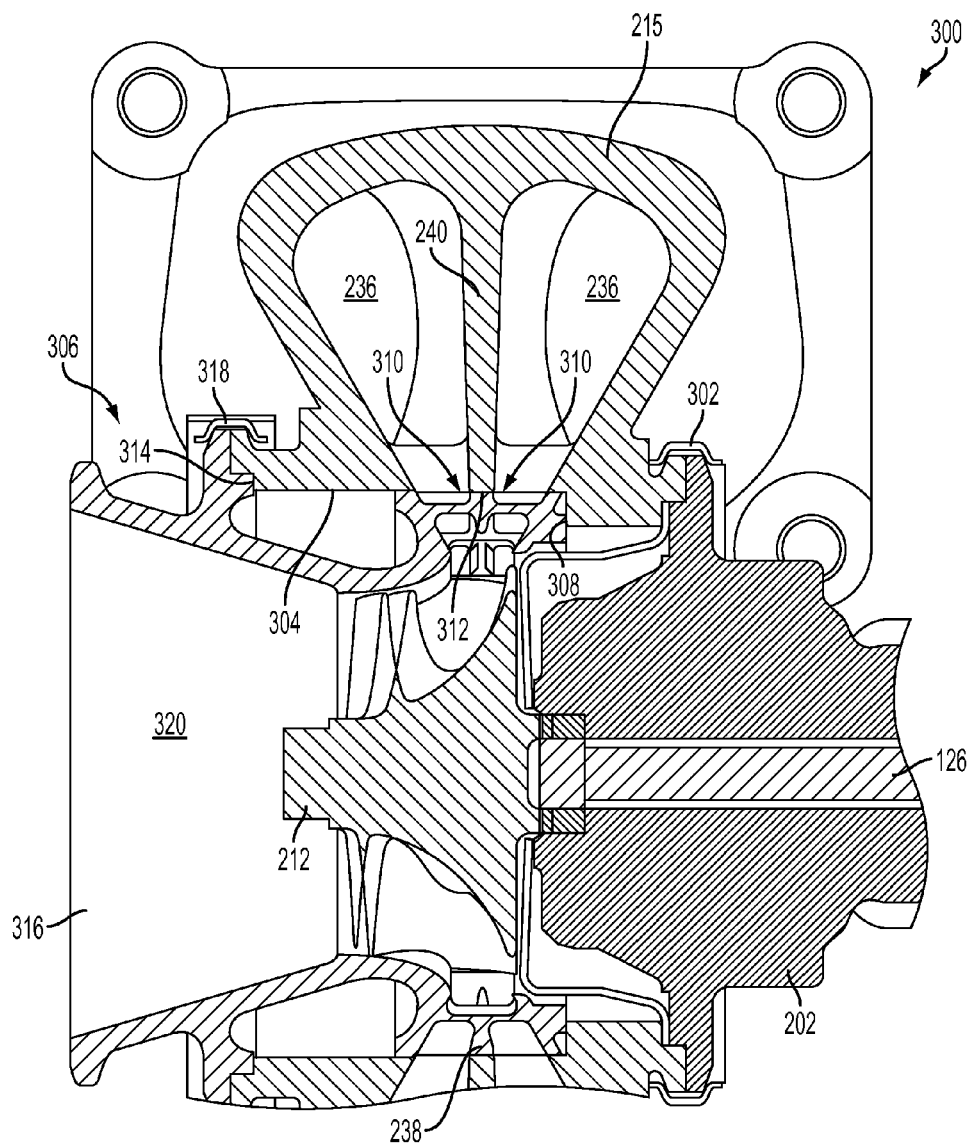
FIG. 6 a section of an alternate embodiment for a turbocharger in accordance with the disclosure.

A first alternative embodiment of a turbine 300 is shown in FIG. 6. The turbine 300 includes a center housing 202 connected to the turbine housing 215 by a v-band clamp 302. Two passages 236 formed in the turbine housing 215 have substantially equal cross-sectional flow areas. The turbine housing 215 further forms a generally cylindrical bore 304 disposed generally concentrically around the turbine wheel 212 between an exhaust outlet end 306 of the turbine housing 215 and an annular stop surface 308. The annular stop surface 308 is positioned on the inboard side of the turbine adjacent the connection to the center housing 202.

The bore 304, which could also form a step (not shown), is open to the two passages 236 along slots 310 that extend circumferentially around the inner portion of the bore 304. The slots 310 are separated by a cylindrical surface 312 formed at an inner end of the divider wall 240. At its free end, the bore 304 forms an outer stop 314 that includes an annular surface extending around the bore 304. The outer stop 314 defines a plane that is parallel to a plane defined by the annular stop surface 308. The bore 304 further has an inner diameter at an area around the slots 310 that is configured to receive and accommodate the outer diameter of a nozzle ring 238. When assembled, the nozzle ring 238 is aligned with the slots 310 such that gas from the passages 236 can pass through the first and second plurality of inlet openings 258 and 260 (see FIG. 5), as previously described.

In the turbine 300, the nozzle ring 238 is integrated with a turbine outlet cone 316. The outlet cone 316 is connected to the exhaust outlet end 306 of the turbine housing 215 with a v-band clamp 318 and includes a generally frusto-conical bore 320. The frusto-conical bore 320 is disposed adjacent the gas outlet side of the turbine wheel 212 to reduce friction and pressure drop of gas passing through the turbine wheel 212 and exiting the turbine 300. A cross section of the frusto-conical outlet cone 316 is shown in FIG. 7.

Figure 7:
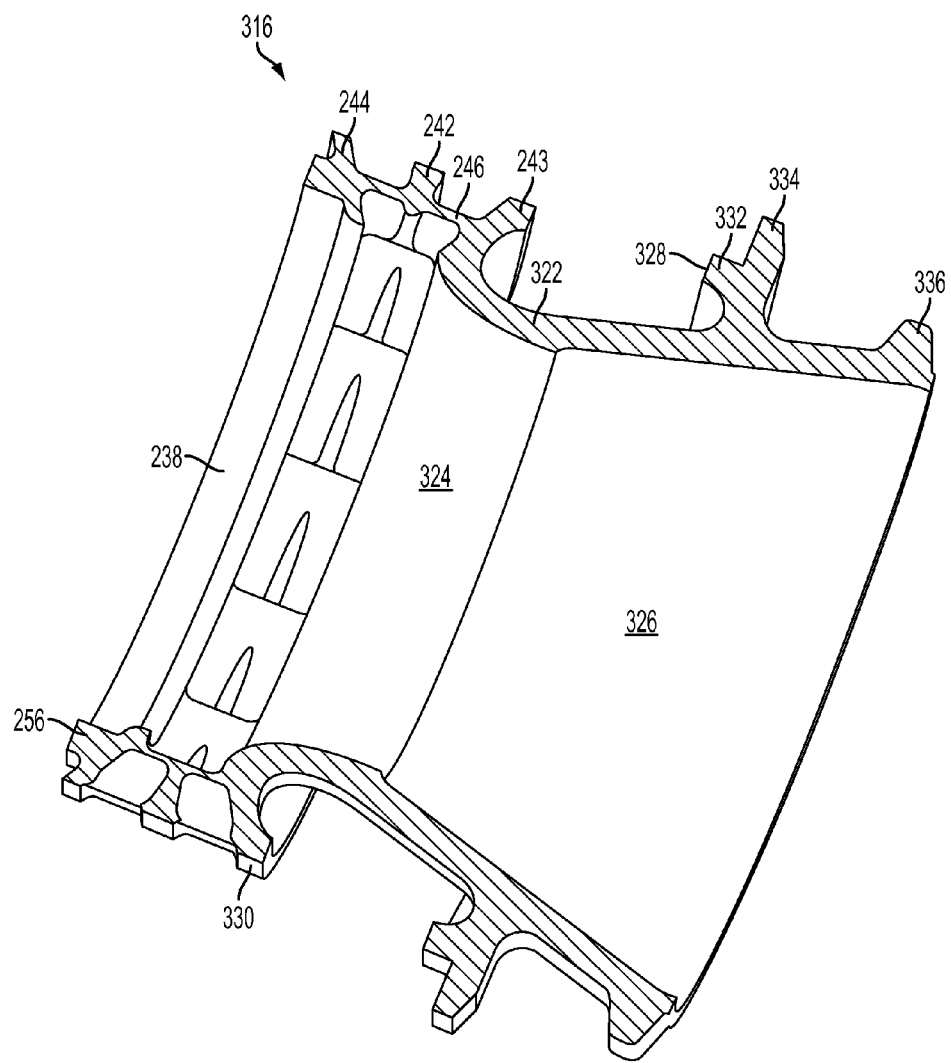
FIG. 7 is a cross section of a turbine outlet having a nozzle ring integrated therewith in accordance with the disclosure.

The outlet cone 316, as shown in FIG. 7, generally includes three portions that are connected to one another to form a single component. The first portion encompasses the nozzle ring 238. The inner ring 242 and the first and second outer rings 243 and 244 are interconnected to one another by the vanes 246. The first outer ring 243 is integrally formed as part of a second portion of the outlet cone 316, which includes a turbine wheel housing 322. The second outer ring 244 forms the contact pad 256 that abuts the annular stop surface 308 (FIG. 6) when the outlet cone 316 is installed within the bore 304 of the turbine housing 215.

The turbine wheel housing 322 includes an inner contoured surface 324 that is disposed radially around an outlet portion of the turbine wheel 212. In the illustrated embodiment, the contour of the inner surface 324 is configured to provide a small clearance around the turbine wheel 212 such that losses are minimized and efficiency of the turbine 300 is improved by ensuring that gasses passing through the wheel 212 are in contact with the blades 214 for as long as possible. The third portion of the outlet cone 316 forms a generally frusto-conical inner surface 326 that is disposed generally tangentially relative to the contoured inner surface 324.

The outlet cone 316 further includes various features used to position and align the various features thereof relative to the turbine housing 215. In addition to the contact pad 256 that abuts the annular stop surface 308, the outlet cone 316 further includes an outer contact pad 328 that abuts the outer stop 314 of the turbine housing 215. While the contact pads 256 and 328 can define the axial location of the outlet cone 316 relative to a centerline of the turbine wheel 212, the substantially concentric positioning of the various features of the outlet cone 316 relative to the bore 304 of the turbine housing 215 is also desirable. In this way, an outer diameter 330 of the nozzle ring 238 and a guide surface 332 have an appropriately sized outer diameter that permits their engagement with the inner portion of the bore 304 to substantially concentrically position the outlet cone in a radial direction relative to the bore 304.

Given the temperature extremes that will be present during service, an appropriate clearance may be selected between the outer diameter of the various features of the outlet cone 316 and the inner diameter of the bore 304 of the turbine housing 215 such that proper positioning may be provided to the outlet cone 316 while sufficient clearance is maintained to allow for material expansion when operating at elevated temperatures. The outlet cone 316 further includes features for mounting to the turbine housing 215 and other components. More specifically, a housing clamp feature 334 is formed adjacent the guide surface 332 and is configured to be engaged by the v-band clamp 318 that secures the outlet cone 316 to the turbine housing 215. An exhaust pipe clamp feature 336 is formed at the free end of the outlet cone 316 such that an exhaust pipe, for example, an end of the tailpipe 134 (FIG. 1), may be connected to the turbine 300. Although various clamp engagement features are shown, any other appropriate type of connection arrangement, such as bolted flanges, etc., may be used between the outlet cone 316 and the turbine housing 215 and/or the outlet cone 316 and other exhaust system components and piping.

Figure 8:
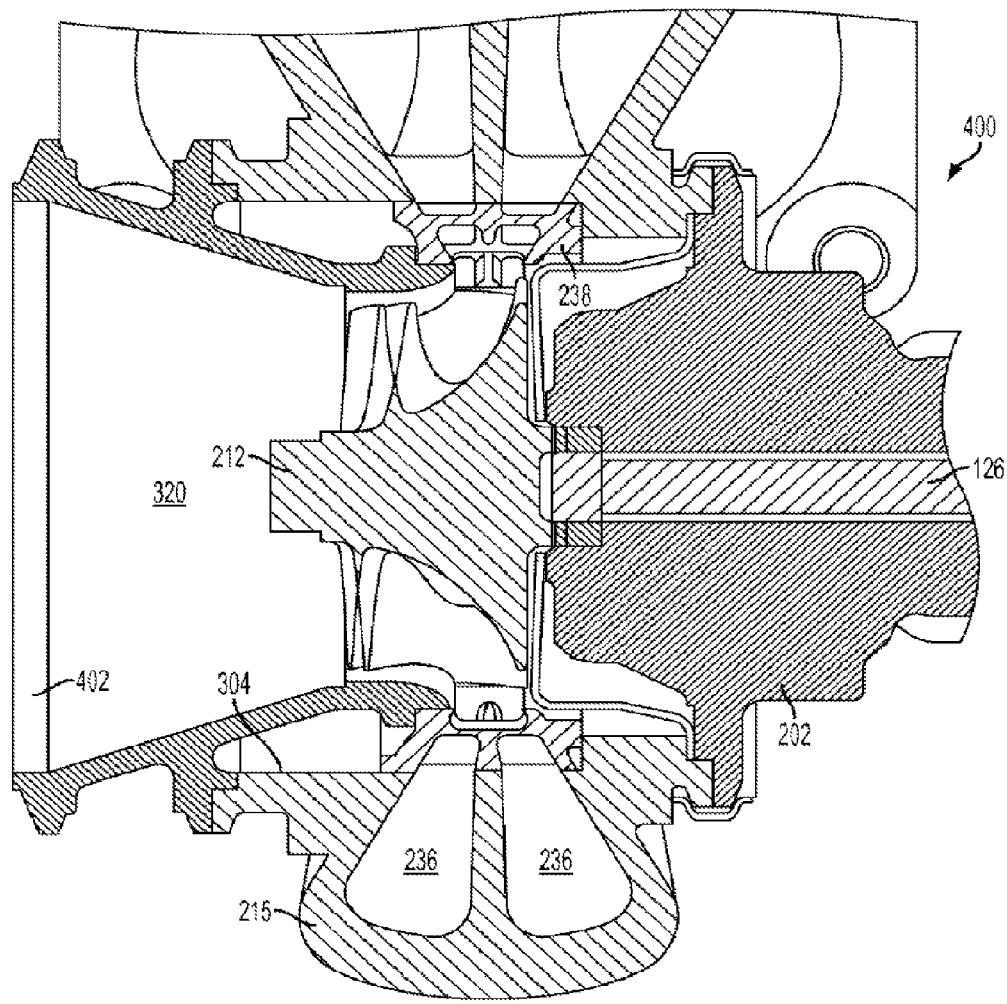
FIG. 8 is a section of another alternate embodiment for a turbocharger in accordance with the disclosure.

An alternate embodiment for a turbine 400 is shown in FIG. 8. Most elements or features of the turbine 400 are the same or similar to those of turbine 300 discussed above except that, in this embodiment, the nozzle ring 238 is not integrated with the outlet cone 402. In other words, the turbine 400 is similar to the turbine 120 (FIG. 2) in that it includes a separate nozzle ring 238. The turbine 400 is also similar to the turbine 300 (FIG. 6) in that the nozzle ring 238 and outlet cone 402 are removable from the exhaust gas outlet side of the turbine 400.

More particularly, the turbine housing 215 of the turbine 400 includes a bore 304 that is similar to that of the turbine 300 as shown in FIG. 6. The bore 304 permits insertion of the nozzle ring 238 around the turbine wheel 212 while the turbine housing 215 is installed onto the center housing 202. Unlike the turbine 120 (FIG. 2), which requires installation of the nozzle ring 238 before the turbine 120 is attached to the center housing 202, the nozzle ring 238 can be installed into the turbine 400 (and also into the turbine 300 as shown in FIG. 6), after the turbocharger has been assembled. From a serviceability standpoint, the nozzle ring 238 in the turbines 300 and 400 can be accessed with ease for removal and/or replacement while the turbine is still connected to the engine.

Figure 9:
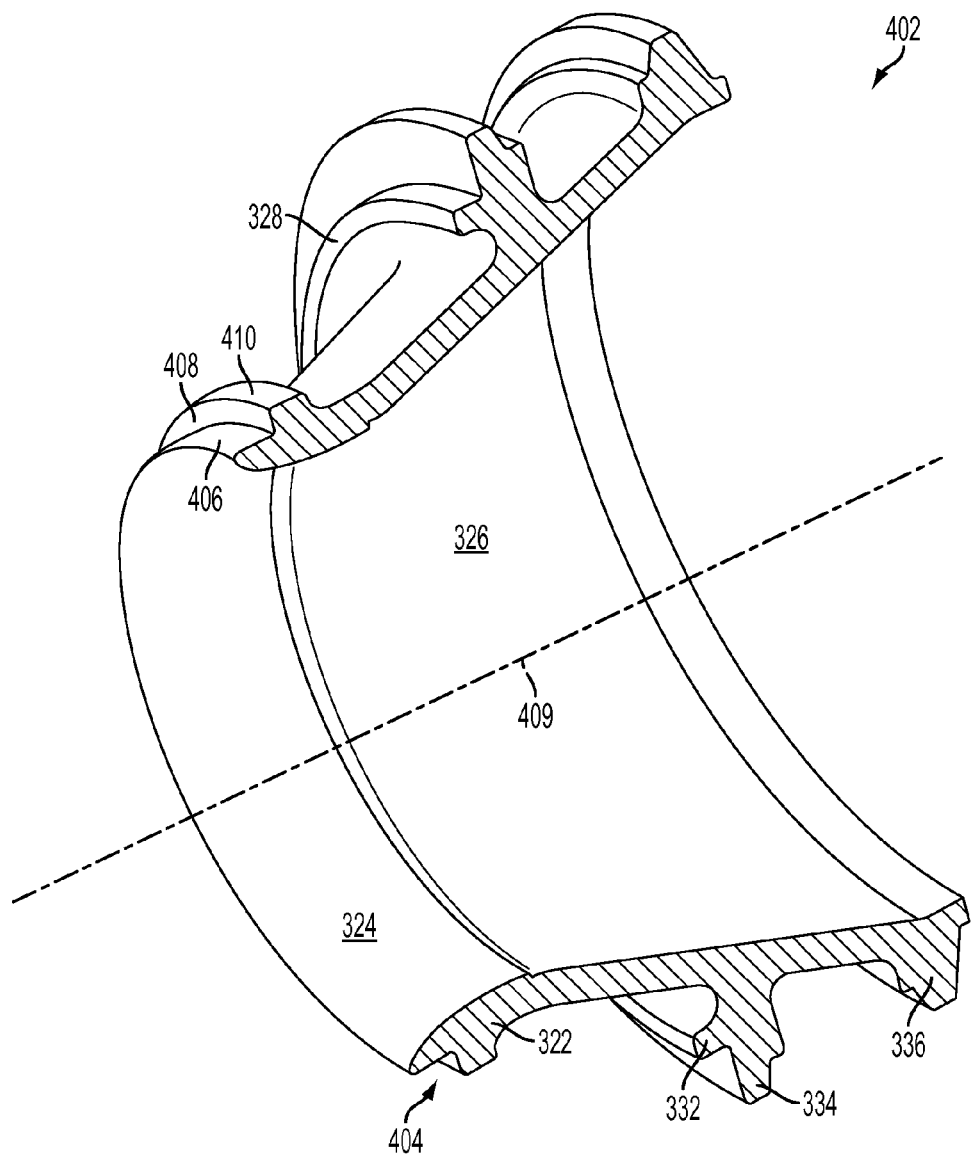
FIG. 9 is a cross section of a turbine outlet having retention features for a nozzle ring in accordance with the disclosure.

In the embodiment shown in FIG. 8, retention and positioning of the nozzle ring 238 within the turbine 400 is accomplished by use of the outlet cone 402. Here, the outlet cone 402, which is shown in detail in the cross section of FIG. 9, includes features that engage and align the nozzle ring 238 relative to surrounding components and features. More specifically, the outlet cone 402 includes a ledge 404. The ledge 404 extends peripherally around an outer portion of the outlet cone 402 and includes an axially extending cylindrical surface 406 and a radially extending annular surface 408 relative to a centerline 409. Although the surfaces 406 and 408 are shown orthogonal to one another, one or both can be defined at a different angle relative to the centerline such as frusto-conical surfaces can achieve both axial and radial alignment.

In the embodiment shown, the axially extending cylindrical surface 406 engages an inner diameter of the outer ring 243 of the nozzle ring 238, and the radially extending annular surface 408 abuts a side of the outer ring 243 when the turbine 400 is assembled. In this way, the nozzle ring 238 can be positioned and secured within the turbine 400. Similar to the outlet cone 316, the outlet cone 402 is connected to the turbine housing 215 by a v-band clamp 318. An outer periphery of the ledge 410 extends axially relative to the centerline 409. The separation of the outlet cone 402 from the nozzle ring 238 can help relieve thermal stresses in the two components. In an alternative embodiment, the outer periphery of the ledge 410 may extend further radially outward to engage the inner portion of the bore 304 to aid align the outlet cone 402 with the turbine housing 215. In the illustrated embodiment, alignment of the outlet cone 402 is further accomplished by engagement of the ledge 404 with the nozzle ring 238, which has an appropriate outer diameter that is sufficiently aligned with the bore 304.

Industrial Applicability

The present disclosure is applicable to turbines, especially those turbines used on turbocharged internal combustion engines. Although an engine 100 having a single turbocharger is shown (FIG. 1), any engine configuration having more than one turbocharger in series or in parallel arrangement is contemplated. Certain disclosed embodiments are especially advantageous in that assembly and/or service of a turbine is facilitated by the novel installation and retention structural configurations described herein.

Figure 10:
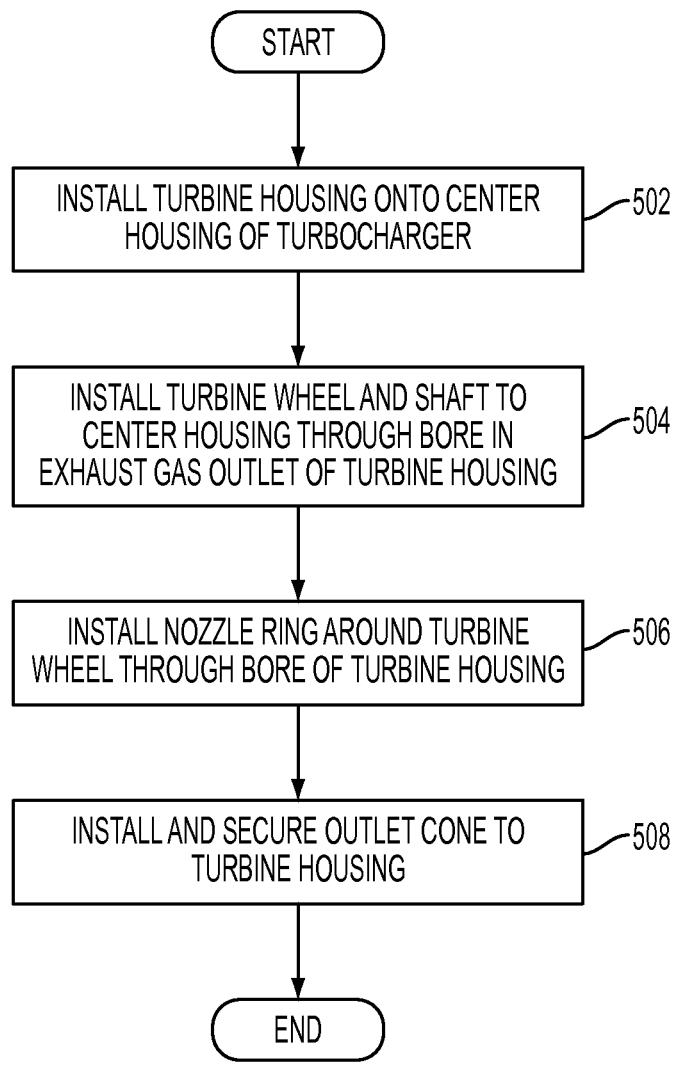
FIG. 10 is a flowchart for a method of assembling a turbine in accordance with the disclosure.

Accordingly, a flowchart for a method of assembling a turbine is shown in FIG. 10. In known assembly methods, a turbine wheel must be assembled onto a shaft, which is then inserted into the center housing of a turbine before the turbine housing can be connected to the center housing. The reason for this assembly sequence is that, in typical turbines, the exhaust gas outlet opening does not have a sufficiently large diameter to enable insertion of the turbine wheel. While this is the case with the turbine 120 shown and described relative to FIG. 2, the embodiments for turbines 300 and 400 advantageously have a sufficient opening to, if desired, install the turbine wheel after the turbine housing has been installed onto the center housing. This ability is advantageous because it avoids the likelihood that damage to the turbine wheel may occur during installation of the turbine housing around the turbine wheel. Alternatively, a traditional assembly sequence may be followed in which the nozzle ring and outlet cone may be pre-assembled into a turbine housing assembly. The turbine housing assembly can then be installed onto a center housing having the turbine wheel and shaft pre-assembled therein.

Turning now to the method shown in FIG. 10, the turbocharger assembly includes installation of a turbine housing onto the center housing at 502. As discussed above, the turbine housing may be, but is not required to be, installed onto the center housing before the turbine wheel and/or shaft is installed. The turbine wheel connected to the turbine shaft is installed and balanced through a bore formed in the exhaust gas outlet of the turbine housing at 504. Alternatively, the turbine shaft and wheel assembly may be provided already pre-balanced.

A nozzle ring may be installed at 506 around the turbine wheel through the bore of the turbine housing. The nozzle ring may be integrated with another component as described above relative to turbine 300, or may be a standalone piece as described relative to turbine 400. In the latter case, an outlet cone may be installed at 506 and secured to the turbine housing at 508. Installation of the outlet cone at 506 may include axially and radially positioning the nozzle ring relative to the turbine housing by appropriately engaging features of the nozzle ring and the outlet cone to one another. Securement of the outlet cone and, therefore, the nozzle ring to the turbine housing at 508 may include any appropriate steps, such as installing clamps, fasteners and the like depending the particular hardware configuration used.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for assembling a turbocharger, comprising:
providing a center housing;
installing a turbine housing onto the center housing, the turbine housing including a bore extending from a gas outlet end of the turbine housing to a stop surface, the bore having a generally cylindrical shape and disposed concentrically around a turbine wheel of the turbocharger when the turbocharger is fully assembled, the bore having an inner diameter along an entire length thereof;
providing a nozzle ring including an inner ring and first and second outer rings, the inner, first and second outer rings having an outer diameter that is configured to fit within the inner diameter of the bore with a clearance fit;
inserting the nozzle ring into the turbine housing through the bore after the turbine housing has been installed onto the center housing, the nozzle ring being disposed circumferentially around at least a portion of the turbine wheel;
inserting and locating an outlet cone having a generally hollow tubular shape into the bore such that an inner portion of the outlet cone is positioned around a remaining portion of the turbine wheel and in abutting relation with the nozzle ring; and
connecting the outlet cone to the turbine housing to thus secure the nozzle ring within the bore of the turbine housing.

2. The method of claim 1, further comprising inserting a turbine wheel connected to a shaft into the center housing through the bore before installing the outlet cone such that the turbine wheel is disposed within the turbine housing and the shaft is rotatably mounted to the center housing.

3. The method of claim 1, further comprising connecting a compressor wheel to a free end of the shaft, and connecting a compressor housing to the center housing such that the compressor housing is disposed around the compressor wheel.

4. The method of claim 1, wherein the nozzle ring and outlet cone are integrated into a single component such that the step of installing the nozzle ring and inserting and locating the outlet cone are accomplished in a single operation.

5. The method of claim 1, wherein the bore has an inner surface, and wherein the step of locating the outlet cone includes slidably engaging the inner surface of the bore with a generally cylindrical outer surface of the outlet cone that extends axially relative to a centerline of the outlet cone.

6. A turbocharger for an internal combustion engine, comprising:
a center housing;
a shaft rotatably supported in the center housing;
a turbine wheel connected at one end of the shaft;
a turbine housing connected to the center housing and disposed around the turbine wheel;
a nozzle ring surrounding a portion of the turbine wheel, the nozzle ring including an inner ring and first and second outer rings connected to one another by vanes;
a bore having a generally cylindrical shape formed in the turbine housing, the bore disposed concentrically around the turbine wheel and extending between an exhaust gas outlet end of the turbine housing and an annular stop surface of the turbine housing disposed adjacent the turbine wheel, the bore having an inner diameter along an entire length of the bore that is at least large enough to accommodate the nozzle ring therein with a clearance fit;
wherein the nozzle ring is disposed within the bore, and
an outlet cone that is integrated with the nozzle ring, the outlet cone disposed at least partially in the bore and surrounding a remaining portion of the turbine wheel, the outlet cone connected to the turbine housing at the gas outlet end thereof to thus secure the nozzle ring within the bore of the turbine housing;
wherein the outlet cone and nozzle ring are configured to be removed from the bore through an exhaust gas outlet opening at the gas outlet end of the turbine housing.

7. The turbocharger of claim 6, wherein the outlet cone and the nozzle ring are connected along the first outer ring of the nozzle ring.

8. The turbocharger of claim 6, wherein the outlet cone includes an annular surface extending radially relative to a centerline of the outlet cone, the annular surface being in abutting relationship to the annular stop surface.

9. The turbocharger of claim 6, wherein the outlet cone includes a generally cylindrical surface extending axially relative to a centerline of the outlet cone, the generally cylindrical surface slidably engaging an inner cylindrical surface of the bore.

10. The turbocharger of claim 6, wherein the outlet cone has a generally hollow tubular shape defining an inner surface, the inner surface comprising a contoured surface disposed radially around an outlet portion of the turbine wheel.

11. The turbocharger of claim 10, wherein the inner surface of the outlet cone further includes a generally frusto-conical inner surface that is disposed generally tangentially relative to the contoured surface.

12. The turbocharger of claim 6, further comprising a compressor connected to the center housing, the compressor including a compressor wheel connected to the shaft.

13. An internal combustion engine comprising a plurality of cylinders fluidly connectable to an intake manifold and to at least one exhaust collector, comprising:
a turbocharger including a turbine and a compressor, the turbine including a turbine housing connected to a center housing and having a gas outlet end and a gas inlet, the gas inlet being in fluid communication with the at least one exhaust collector, and a turbine wheel connected to a shaft that is rotatably mounted within the center housing such that the turbine wheel is enclosed within the turbine housing;

a nozzle ring surrounding a portion of the turbine wheel, the nozzle ring including an inner ring and first and second outer rings connected to one another by vanes;

a bore having a stepped cylindrical shape formed in the turbine housing, the bore disposed concentrically around the turbine wheel and extending between an exhaust gas outlet end of the turbine housing and an annular stop surface of the turbine housing disposed adjacent the turbine wheel, the bore including a first internal diameter portion having a first internal diameter, which accommodates therein an outer diameter of the inner ring with a clearance fit, and the bore forming a second internal diameter portion having a second internal diameter, which second internal diameter is larger than the first internal diameter, and which accommodates therein the first outer ring with a clearance fit, wherein the nozzle ring is disposed within the bore, and an outlet cone disposed at least partially in the bore and surrounding a remaining portion of the turbine wheel, the outlet cone connected to the turbine housing at the gas outlet end thereof, wherein the outlet cone and the nozzle ring are configured to be removed from the bore through an exhaust gas outlet opening at the gas outlet end of the turbine housing.

14. The internal combustion engine of claim 13, wherein the outlet cone and the nozzle ring are integrated into a single component.

15. The internal combustion engine of claim 13, wherein the outlet cone includes an annular surface extending radially relative to a centerline of the outlet cone, the annular surface being in abutting relationship to the annular stop surface.

16. The internal combustion engine of claim 13, wherein the outlet cone includes a generally cylindrical surface extending axially relative to a centerline of the outlet cone, the generally cylindrical surface slidably engaging an inner cylindrical surface of the bore.

17. The internal combustion engine of claim 13, wherein the outlet cone has a generally hollow tubular shape defining an inner surface, the inner surface comprising a contoured surface disposed radially around an outlet portion of the turbine wheel.

18. The internal combustion engine of claim 17, wherein the inner surface of the outlet cone further includes a generally frusto-conical inner surface that is disposed generally tangentially relative to the contoured surface.

19. The internal combustion engine of claim 13, further comprising a compressor connected to the center housing, the compressor including a compressor wheel connected to the shaft, and a compressor housing fluidly connected to the intake manifold and surrounding the compressor wheel.

20. The internal combustion engine of claim 13, further comprising an exhaust gas recirculation (EGR) system fluidly interconnected between the intake manifold and the at least one exhaust collector.

* * * * *